United States Patent
Minard

(10) Patent No.: US 6,247,020 B1
(45) Date of Patent: Jun. 12, 2001

(54) DEVELOPMENT SYSTEM WITH APPLICATION BROWSER USER INTERFACE

(75) Inventor: Jayson R. Minard, Littleton, CO (US)

(73) Assignee: Borland Software Corporation, Scotts Valley, CA (US)

( * ) Notice: Subject to any disclaimer, the term of this patent is extended or adjusted under 35 U.S.C. 154(b) by 0 days.

(21) Appl. No.: 08/992,434

(22) Filed: Dec. 17, 1997

(51) Int. Cl.[7] .............. G06F 17/30; G06F 17/00; G06F 13/00
(52) U.S. Cl. .............. 707/104; 707/501; 707/513; 709/206; 345/357; 345/435; 717/1; 717/4
(58) Field of Search .............. 707/501, 513, 707/206, 1, 101, 104; 709/203, 206, 224, 229; 345/357, 435; 395/500.13; 717/1, 4

(56) References Cited

U.S. PATENT DOCUMENTS

| | | | |
|---|---|---|---|
| Re. 36,422 | * 11/1999 | Pazel ................................. | 707/104 |
| 5,734,882 | 3/1998 | Lopresti et al. .................... | 707/200 |
| 5,740,444 | 4/1998 | Frid-Nielsen ...................... | 717/5 |
| 5,768,510 | * 6/1998 | Gish .................................. | 709/203 |
| 5,794,259 | 8/1998 | Kikinis .............................. | 707/507 |
| 5,801,689 | 9/1998 | Huntsman ......................... | 345/329 |
| 5,802,334 | 9/1998 | Nickolas et al. .................. | 345/357 |
| 5,815,154 | 9/1998 | Hirschtick et al. ................ | 345/356 |
| 5,815,415 | * 9/1998 | Bently et al. ..................... | 703/4 |
| 5,826,254 | 10/1998 | Kahn ................................. | 707/5 |
| 5,835,712 | 11/1998 | DuFresne ......................... | 709/203 |
| 5,838,906 | 11/1998 | Doyle et al. ...................... | 709/202 |
| 5,842,020 | * 11/1998 | Faustini ............................ | 717/1 |
| 5,845,298 | * 12/1998 | O'Connor et al. ................ | 707/206 |
| 5,848,424 | 12/1998 | Scheinkman et al. ............. | 707/501 |
| 5,852,439 | 12/1998 | Musgrove et al. ................ | 345/339 |
| 5,864,676 | * 1/1999 | Beer et al. ........................ | 709/229 |
| 5,870,559 | * 2/1999 | Lesham et al. ................... | 709/224 |
| 5,877,766 | * 3/1999 | Bates et al. ....................... | 345/357 |
| 5,917,498 | * 6/1999 | Korenshtein ..................... | 345/435 |
| 5,953,525 | * 9/1999 | Glaser et al. ..................... | 717/1 |
| 6,026,362 | * 2/2000 | Kim et al. ......................... | 705/1 |
| 6,078,327 | * 9/1999 | Liman et al. ..................... | 345/357 |

* cited by examiner

Primary Examiner—Kim Vu
Assistant Examiner—Ella Colbert
(74) Attorney, Agent, or Firm—John A. Smart

(57) ABSTRACT

A component-based, rapid application development (RAD) Java environment providing an improved user interface is described. The interface includes a single Application Browser or "AppBrowser" that is used to perform all the usual development functions. The AppBrowser lets the user explore, edit, design, and debug all in one unified window. Serving as a mechanism for hosting arbitrary documents or other objects related to development, the AppBrowser presents the documents or other objects for manipulation in a window that consists of three panes: Navigation pane, Content pane, and Structure pane. In general, the Navigation pane displays a list of documents, the Content pane displays the document itself, and the Structure pane displays the structure of the document if available. The grouping of the three panes exists on a browser "context" or mode. Multiple contexts can appear on an AppBrowser represented by a tab in a tab set at the lower left of the window. These contexts add a 3D feel to AppBrowser by layering its functionality in one window rather than spread across multiple windows. Switching between completely different contexts is then as easy as selecting a tab. The AppBrowser may have different logic for any given context that is global across the three panes; the logic is provided by implementing a standard browser context interface.

33 Claims, 16 Drawing Sheets

DEVELOPMENT SYSTEM WITH APPLICATION BROWSER USER INTERFACE

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to a development environment for creating application programs and other software and, particularly, to system and methods providing an improved interface for such an environment.

With the explosive growth of the Internet and the World Wide Web, an ever-increasing number of computers of disparate platforms are being connected together. As a result, there is renewed interest in distributing software in binary format which operates in this ever-increasing heterogeneous environment. In the early 1990s, a team at Sun Microsystems developed a new language, "Java," to address the issues of software distribution on the Internet. Java is a simple, object-oriented language which supports multi-thread processing and garbage collection. Although the language is based on C++, a superset of C, it is much simpler. More importantly, Java programs are "compiled" into a binary format that can be executed on many different platforms without recompilation. The language includes built-in mechanisms for verifying and executing Java "binaries" in a controlled environment, protecting the user's computer from potential viruses and security violations.

A typical Java system comprises the following set of interrelated technologies: a language specification; a compiler for the Java language that produces bytecodes from an abstract, stack-oriented machine; a virtual machine (VM) program that interprets the bytecodes at runtime; a set of class libraries; a runtime environment that includes bytecode verification, multi-threading, and garbage collection; supporting development tools, such as a bytecode disassembler; and a browser (e.g., Sun's "Hot Java" browser).

Java is designed for creating applications that will be deployed in heterogeneous networked environments. Such environments are characterized by a variety of hardware architectures. Further, applications in such environments execute atop a variety of different operating systems and interoperate with a multitude of different programming language interfaces. To accommodate such diversity, the Java compiler generates platform-neutral "bytecodes"—an architecturally neutral, intermediate format designed for deploying application code efficiently to multiple platforms.

Java bytecodes are designed to be easy to interpret on any machine. Bytecodes are essentially high-level, machine-independent instructions for a hypothetical or "virtual" machine that is implemented by the Java interpreter and runtime system. The virtual machine, which is actually a specification of an abstract machine for which a Java language compiler generates bytecode, must be available for the various hardware/software platforms which an application is to run. The Java interpreter executes Java bytecode directly on any machine for which the interpreter and runtime system of Java have been ported. In this manner, the same Java language bytecode runs on any platform supported by Java.

Compiling Java into platform-neutral bytecodes is advantageous. Once the Java language interpreter and runtime support are available on a given hardware and operating system platform, any Java language application can be executed. The bytecodes are portable since they do not require a particular processor, architecture, or other proprietary hardware support. Further, the bytecodes are byte-order independent, so that programs can be executed on both big-endian machines (e.g., Intel architecture) and little-endian machines (e.g., Motorola architecture). Since Java bytecodes are typed, each specifies the exact type of its operands, thereby allowing verification that the bytecodes obey language constraints. All told, the interpreted bytecode approach of compiled Java language programs provides portability of programs to any system on which the Java interpreter and runtime system have been implemented.

The bytecodes are actually stored in "class" files. Each class file stores all the information for a particular Java class. A "class" in Java is a software construct which defines instance variables and methods, in effect, serving as a template for creating objects of a particular type. In this regard, a Java class is akin to a C++class. A very simple "Point" class, for instance, may be declared as follows.

class Point {
       public double x; /* instance variable */
       public double y; /* instance variable */
    }

This declaration serves as a template from which "Point" objects can be instantiated.

Actual instantiation of an object occurs in a manner similar to that found in the C++programming language. For example, a variable which refers to a "Point" object can be declared as follows:

Point myPoint;

An instance of a point object is allocated as follows.

myPoint=new Point( );

Here, one can now access variables of the "Point" object, using familiar "dot" notation for referring to the names of the variables.

myPoint.x=10;
    myPoint.y=20;

Objects communicate by sending messages to each other. A recipient object responds to a message by selecting a particular method to execute. If one object wants another object to do some work on its behalf, for instance, the first object sends a message to the second object. The second object, in response, invokes the method which is appropriate for processing the message. The methods themselves, therefore, define the behavior of objects instantiated from a class. In particular, it is an object's methods which manipulate the object's data—its instance variables.

Further description of the Java Language environment can be found in Gosling, J. et al., *The Java Language Environment. A White Paper,* Sun Microsystems Computer Company, October 1995, the disclosure of which is hereby incorporated by reference.

"Visual" development environments, such as Borland's Delphi™, Microsoft® Visual Basic, Microsoft®J++, and Powersoft's PowerBuilder™, are rapidly becoming preferred development tools for quickly creating production applications, including those created with the Java programming language. Such environments are characterized by an integrated development environment (IDE) providing a form painter, a property getter/setter manager ("inspector"), a project manager, a tool palette (with objects which the user can drag and drop on forms), an editor, a compiler, and a linker. In general operation, the user "paints" objects on one or more forms, using the form painter. Attributes and properties of the objects on the forms can be modified using the property manager or inspector. In conjunction with this operation, the user attaches or associates program code with particular objects on screen (e.g., button object); the editor is used to edit program code which has been attached to particular objects.

Because development projects—particularly Java projects—use many files, and because the various development tasks (such as editing, debugging, and browsing for information) have traditionally used multiple windows, it can be difficult to find the window one needs. What is needed is a system with an improved user interface which simplifies the job. In particular, what is needed is a simplified application browser that is used to perform all the usual development functions. The present invention fulfills this and other needs.

SUMMARY OF THE INVENTION

The present invention is embodied in a component-based, rapid application development (RAD) Java environment. The system's user interface is structured to increase one's productivity, particularly when developing in Java. Because Java projects use many files, and because the various development tasks (such as editing, debugging, and browsing for information) have traditionally used multiple windows, it can be difficult to find the window one needs. To simplify one's job, therefore, the present invention introduces a new concept in user interfaces for development environments: a single Application Browser or "AppBrowser" that is used to perform all the usual development functions.

The AppBrowser lets the user explore, edit, design, and debug all in one unified window. Serving as a mechanism for hosting arbitrary documents related to development, the AppBrowser presents the documents (or other objects) for manipulation in a window that consists of three panes: Navigation pane, Content pane, and Structure pane. In general, the Navigation pane displays a list of documents, the Content pane displays the document itself, and the Structure pane displays the structure of the document if available.

The grouping of the three panes exists on a browser "context". Multiple contexts can appear on an AppBrowser represented by a tab in a tab set at the lower left of the window. These contexts add a 3D feel to AppBrowser by layering its functionality in one window rather than spread across multiple windows. Switching between completely different contexts is then as easy as selecting a tab. The AppBrowser may have different logic for any given context that is global across the three panes; this logic is provided by implementing a standard browser context interface.

DETAILED DESCRIPTION OF A PREFERRED EMBODIMENT

The following description will focus on a preferred embodiment of the present invention (and certain alternatives) embodied in a visual development environment running on an Intel 80×86-compatible computer operating under an event-driven operating system, such as the Microsoft® Windows environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

General Architecture

A. System Hardware

Figure 1A:
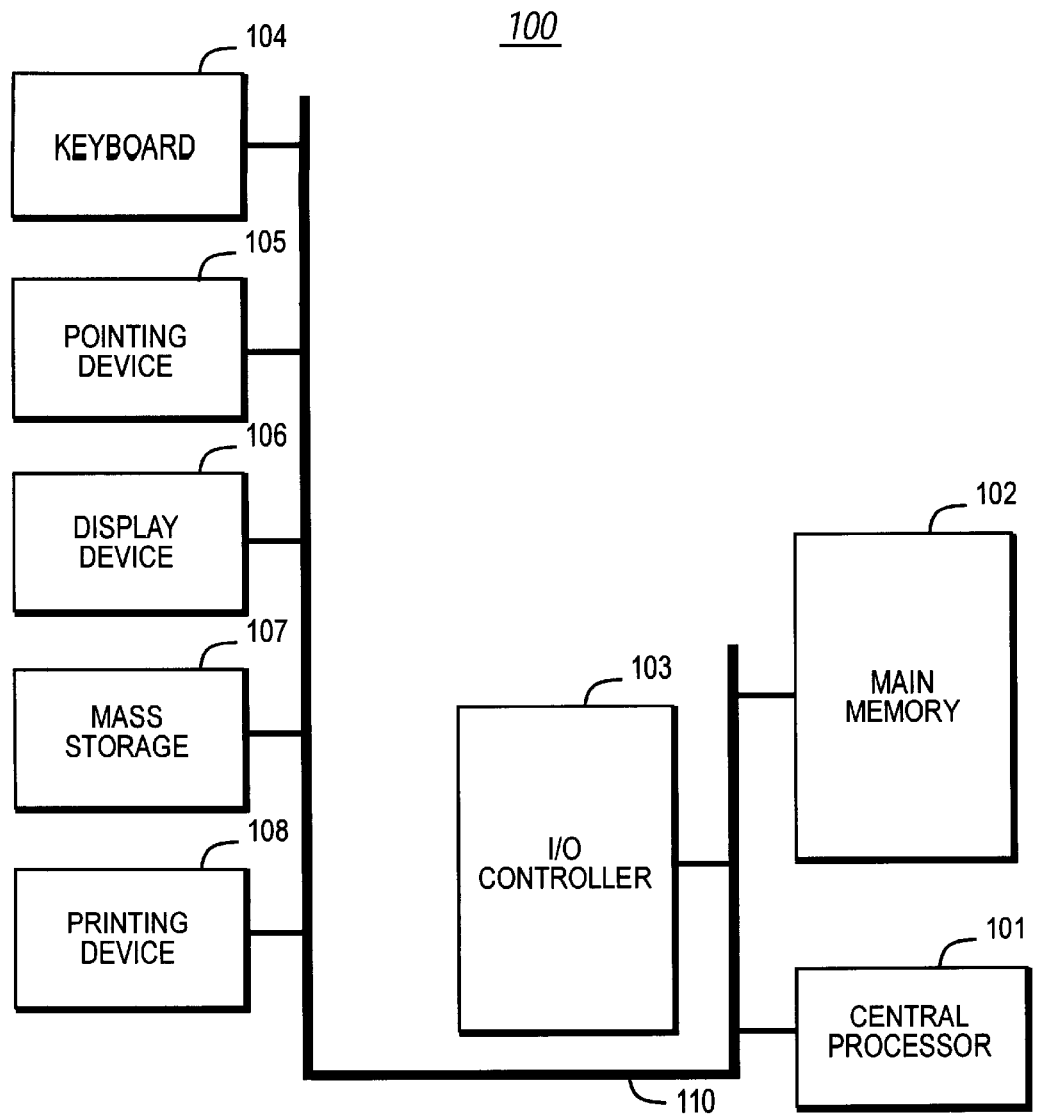
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., removable disk, floppy disk, fixed disk, optical disk (including CD-ROM), and the like). Additional input/output devices, such as a printing device 108, may be provided with the system 100 as desired. As shown, the various components of the system 100 communicate through a system bus 110 or similar architecture. In a preferred embodiment, the system 100 includes an IBM-compatible personal computer, available from a variety of vendors (including IBM of Armonk, N.Y.).

B. System Software

Figure 1B:
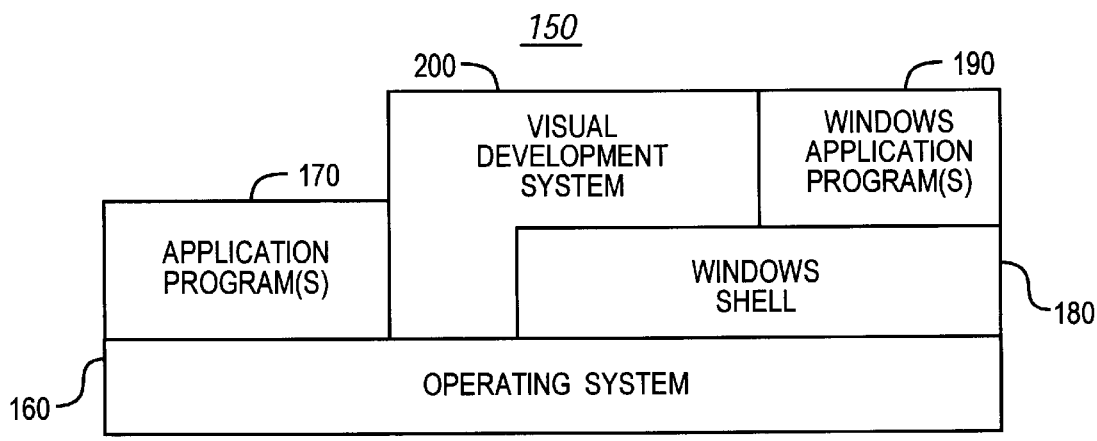
FIG. 1B is a block diagram of a software system for controlling the operation of the system of FIG. 1A.

Illustrated in FIG. 1B, a computer software system 150 is provided for directing the operation of the computer system 100. Software system 150, which is stored in system memory 102 and/or on disk storage 107, includes a kernel or operating system (OS) 160 and a windows shell or interface 180. One or more application programs, such as application programs 170 or windows applications programs 190, may be "loaded" (i.e., transferred from storage 107 into memory 102) for execution by the system 100. OS 160 and shell 180, as well as application software 170, 190, include an interface for receiving user commands and data and displaying results and other useful information. Software system 150 also includes a visual development system 200 of the present invention for developing system and application programs. As shown, the development system 200 includes components which interface with the system 100 through windows shell 180, as well as components which interface directly through OS 160.

In a preferred embodiment, operating system 160 and windows shell 180 are provided by Microsoft® Windows 95/Windows NT, available from Microsoft Corporation of Redmond, Wash. Those skilled in the art will appreciate that the system may be implemented in other platforms, including Macintosh, UNIX, and the like. Development system 200, on the other hand, includes JBuilder™, available from Borland International of Scotts Valley, Calif. Application software 170, 190 can be any one of a variety of software applications, such as word processing, database, spreadsheet, text editors, and the like, including those created by the development system 200.

C. Development System

Figure 2A:
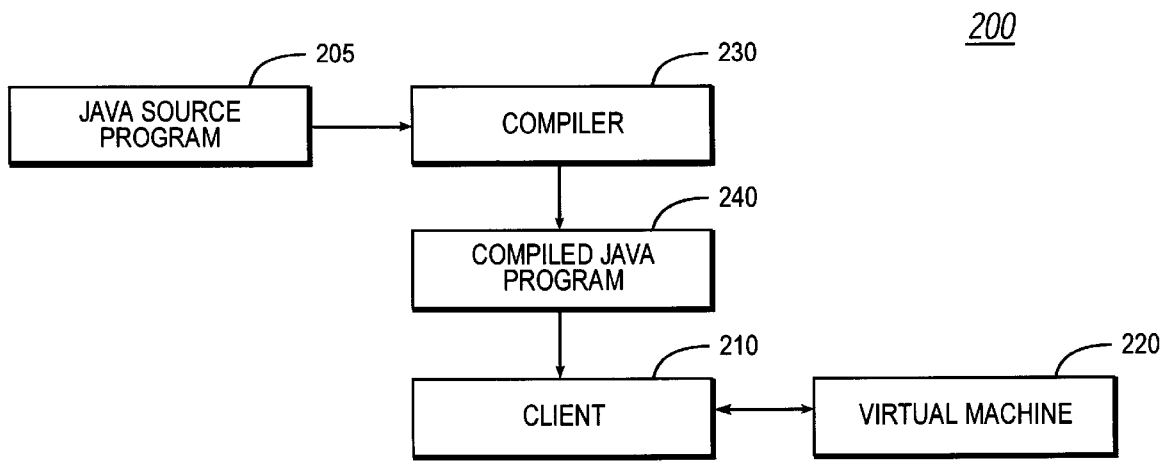
FIG. 2A is a block diagram of a Java development system.

Shown in further detail in FIG. 2A, a Java development system 200 of the present invention includes a client 210 which employs a virtual machine 220 for executing programs. In particular, the client 210 executes a "compiled" (i.e., bytecode or pseudo-compiled) Java program 240, which has been created by compiling a Java source code program or script 205 with a Java compiler 230. Here, the Java source code program 205 is an application program written in the Java programming language; the pseudo-compiled program 240, on the other hand, comprises the bytecode emitted by the compiler 230. The virtual machine 220 includes a runtime interpreter for interpreting the Java bytecode program 240. During operation, the client 210 simply requests the virtual machine 220 to execute a particular Java compiled program.

Figure 2B:
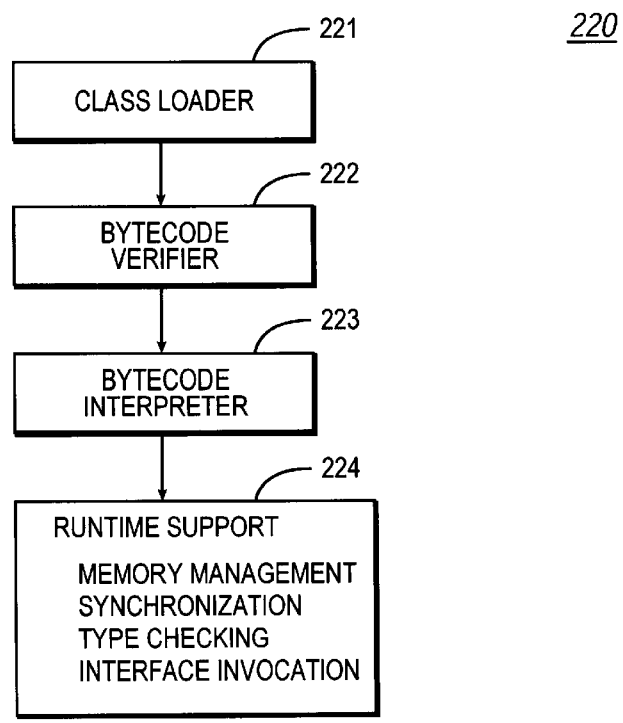
FIG. 2B is a block diagram showing further detail of the virtual machine of the Java development system of FIG. 2A.

As shown in FIG. 2B, the virtual machine 220 comprises a class loader 221, a bytecode verifier 222, a bytecode interpreter 223, and runtime support libraries 224. The class loader 221 is responsible for unpacking the class file which has been requested by a client. Specifically, the loader will unpack different sections of a file and instantiate in-memory corresponding data structures. The class loader will invoke itself recursively for loading any superclasses of the current class which is being unpacked.

The bytecode verifier 222 verifies the bytecode as follows. First, it checks whether the class has the correct access level. Since the class will access other classes for invoking their methods, the bytecode verifier must confirm that appropriate access is in place. Additionally, the bytecode verifier confirms that the bytecode which comprises the methods is not itself corrupt. In this regard, the bytecode verifier confirms that the bytecode does not change the state of the virtual machine (e.g., by manipulating pointers).

Once the bytecode has been verified, a "class initializer" method is executed. It serves, in effect, as a constructor for the class. The initializer is not a constructor in the sense that it is used to construct an instance of a class—an object. The class initializer, in contrast, initializes the static variables of the class. These comprise the variables which are present only once (i.e., only one instance), for all objects of the class.

Runtime support libraries 224 comprise functions which provide runtime support to the virtual machine, including memory management, synchronization, type checking, and interface invocation. At the client, runtime support libraries 224 are included as part of the virtual machine; the libraries are not downloaded with the Java application. The bytecode which is executed repeatedly calls into the runtime support libraries 224, for invoking various Java runtime functions.

D. General Development Interface

The present invention is embodied in a component-based, rapid application development (RAD) Java environment (commercially embodied as Borland JBuilder™). Many of the traditional requirements of programming, particularly for GUI applications, are handled for the programmer automatically by the system.

Figure 3:
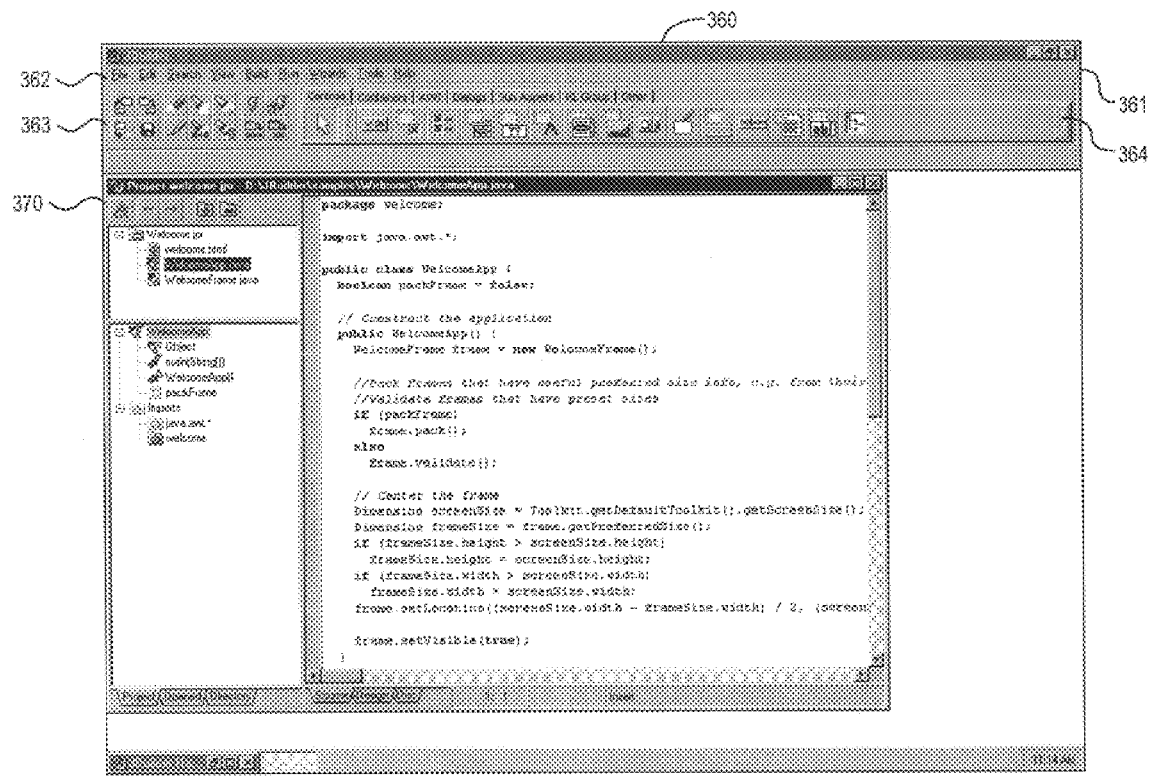
FIG. 3 is a bitmap screen shot illustrating a preferred interface of a Java-based visual development system of the present invention.

FIG. 3 illustrates a preferred interface of the Java-based visual development or programming environment 360 provided by the system. As shown, the programming environment 360 comprises a main window 361. The main window 361 itself comprises main menu bar 362, tool bar (buttons) 363, and component palette 364.

Main menu bar 362 lists user-selectable commands, in a conventional manner. The menu bar 362 is where the user selects menu commands. The following provides brief descriptions of menu commands.

| Menu | Commands for |
|---|---|
| File menu | Creating, opening, closing, renaming and saving files and projects; removing files from projects; configuring printers; printing files. |
| Edit menu | Copying, pasting, deleting and selecting text; undoing and redoing actions. |
| Search menu | Finding and replacing text; searching for text incrementally and by line number; searching for text across a source path; searching for a symbol. |
| View menu | Viewing Debugger windows, a new AppBrowser, the next or previous error message, the tool bar or the Component Palette. |
| Build menu | Making or building the selected node. |
| Run menu | Running the application or applet; stepping over or tracing into code; running to the end of a selected method; pausing the program; setting watches or breakpoints; inspecting, evaluating and modifying. |
| Wizards menu | Running utility wizards for tasks such as implementing an interface, overriding a method, bundling resources, and wrapping an applet. |
| Tools menu | Displaying the Environment Options dialog; invoking the Windows Notepad and Calculator and other internal tools. |
| Help menu | Displaying documentation, such as the Help system, a BeansExpress tutorial for creating Java Bean components, the JDK API Reference, and the JBCL API Reference. Also for viewing Online web site in the user's default web browser, loading the Welcome project for experimenting, and seeing information about this release of product. |

Working in conjunction with the main menu, tool bar 363 provides the user with shortcuts to the most common commands from the main menu for commonly performed tasks, such as opening and saving a project; creating a new application; building, compiling and debugging; undoing an action; and searching and replacing text. The tool bar is configurable by the user for including icons for most of the menu commands. In an exemplary embodiment, the following are provided.

| Button | Commands for |
| --- | --- |
| File\|Open | Opens a project, file, or package. |
| File\|Close | Closes the active window. |
| File\|Save File | Saves the active file. |
| File\|Save Project | Saves the current project and all changed files that are shown in the system's project tree. |
| Edit\|Undo | Reinserts any characters deleted, deletes any characters inserted, replaces any characters the user overwrites, or moves the cursor back to its prior position. |
| Edit\|Redo | Reverses the effects of an Undo. |
| Search\|Find | Searches for text within the active file. |
| Search\|Replace | Replaces specified text with other specified text in the current file. |
| Search\|Search | Again Finds the next occurrence of a search string in the current file. |
| Search\|Browse | Loads the specified class into the AppBrowser. The class must be on the imports path of the current file. |
| Run\|Run | Compiles and runs the application using the startup parameters in the Parameters dialog box. |
| Run\|Debug | Compiles the program and runs it in the Debugger using the startup parameters in the Parameters dialog box. |
| Build\|Make | Compiles any .java files within the selected node that have outdated or nonexistent .class files. Also compiles any of the node's imported files that the node depends on which have outdated or nonexistent .class files. |
| Build\|Rebuild | Compiles all .java files within the selected node, regardless of whether their .class files are outdated. Also compiles the imported files upon which the node depends, regardless of whether their .class files are outdated. |

By placing the mouse pointer over the tool bar buttons, without clicking, the user can view flyover labels of the buttons.

The component palette 364 displays components available in the Borland JBuilder component library. Components are the elements which a user employs to build his or her applications. They include all of the visible parts of an application, such as dialog boxes and buttons, as well as those which are not visible while the application is running (e.g., system timers). In the programming environment 360, components are grouped functionally on different pages of the component palette 364. Each functional group is identified by a tab member, which includes a label indicating the particular nature of the group. The palette can incorporate user-created custom controls, which the user installs onto the palette. Additionally, the user can install third-party components.

Further description of Borland JBuilder™ is provided by the following manuals (available from Borland International, Inc. of Scotts Valley, Calif.): *JBuilder User's Guide* (Part No. JBA1310WW21770), *JBuilder Programmer's Guide* (Part No. JBA1310WW21771), and *Java Beans Component Library Reference Volumes* 1&2 (Part Nos. JBA1310WW21772 and JBA1310WW21773). The disclosures of the foregoing are hereby incorporated by reference.

When the user first opens the IDE, the system also displays an Application Browser user interface or "AppBrowser" 370 of the present invention. The following description will focus on those features of the development system 200 which are helpful for understanding methods of the present invention for implementing an application browser user interface in the visual development environment.

Application browser (AppBrowser) user interface

A. General

The system's user interface is structured to increase one's productivity, particularly when developing in Java. Because Java projects use many files, and because the various development tasks (such as editing, debugging, and browsing for information) have traditionally used multiple windows, it can be difficult to find the window one needs. To simplify one's job, therefore, the present invention introduces a new concept in user interfaces for development environments: a single Application Browser or "AppBrowser" that is used to perform all the usual development functions.

Figure 4A:
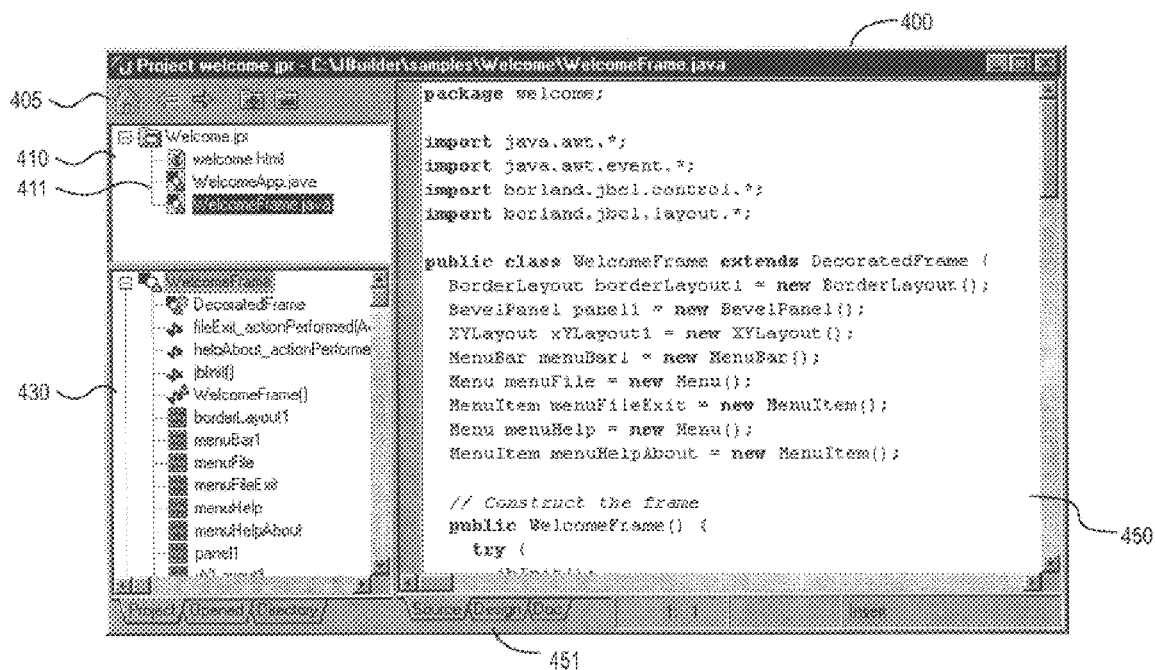
FIG. 4A is a bitmap screen shot illustrating an application browser interface of the present invention.

The AppBrowser, which is shown in particular detail at 400 in FIG. 4A, lets the user explore, edit, design, and debug all in one unified window. Serving as a mechanism for hosting arbitrary documents related to development, the AppBrowser 400 presents the documents (or other objects) for manipulation in a window that consists of three panes: Navigation pane 410, Content pane 450, and Structure pane 430. In general, the Navigation pane 410 displays a list of documents, the Content pane 450 displays the document itself, and the Structure pane 430 displays the structure of the document if available.

The grouping of the three panes exists on a browser "context". Multiple contexts can appear on an AppBrowser represented by a tab in a tab set at the lower left of the window. These contexts add a 3D feel to AppBrowser by layering its functionality in one window rather than spread across multiple windows. Switching between completely different contexts is then as easy as selecting a tab. The AppBrowser may have different logic for any given context that is global across the three panes; this logic is provided by implementing a standard browser context interface. Each of the three panes has specific behaviors which will now be described.

B. Navigation pane

The Navigation pane 410 displays a tree 411 comprising a single parent node that may have children. The parent may or may not be visible but the children always are. Each child may also be a parent of other arbitrary nodes. An example of a parent node would, for instance, include a development project with its children being files within the project or folders containing other files.

Actions allowed in the Navigation pane include the selecting of a current node which, in turn, synchronizes the Content and Structure panes to point to the same node. The nodes in the Navigation pane may also present menu items on the main window, context menus, or tool bar buttons on the AppBrowser's local tool bar. A node may also decide to change the root parent of the Navigation pane to another node (i.e., "Drilling Down"). When a new node is set as the main parent node of the Navigation pane, it is added to a history list of visited parent nodes.

This history list is navigated using Home, Previous, and Next buttons shown at 405, at the top of the Navigation pane. The Home button goes to the first node in the history list; the Previous and Next buttons incrementally travel backward and forward in the list. Nodes that are able to be used in the Navigation pane implement standard interfaces (ANT or Addon Node Type nodes). ANT nodes that are available for the system to use are provided by the host of the AppBrowser window or by addins to the system.

C. Content pane

The actual view of the current node (from the Navigation pane) is shown in the Content pane 450. For instance, if the user selects a Java file in the Navigation pane, the source code for the file is displayed ready for editing in the Content pane. As shown at 451, the Content pane includes tabs which control the kind of viewer or editor used in the Content pane. The actual view displayed may take different concurrent forms. Examples include the Editor (Source tab), the UI Designer (Design tab), and Documentation Viewer (Doc tab). Other available viewing contexts or modes of the Content pane are HTML (HyperText Markup Language) Browser (View tab) and Image Viewer (Viewer tab). The views may be layered in the pane. The layering of views for a node is shown as tabs within a tab set at the bottom of the Content pane. An example of content layering would be that an HTML file which has both a WYSIWYG editor and an HTML editor for the HTML source code. These would each be represented by tabs that can then be selected by the user.

The Content pane displays the detailed content of the file selected in the Navigation pane with the actual editor or viewer being used is determined by the file's extension, as shown in the following table.

| File Type | Editor(s) or Viewer(s) available in the Content pane |
|---|---|
| Text files | If the user selects a text file in the Navigation pane (a file with an extension such as .txt or .bat), a single editor, identified by the Source tab, is available in the Content pane. This is a simple text editor that lets one see and modify the text file. JBuilder recognizes certain file extensions (such as .txt and .bat) as text files. However, the user can extend this list. |
| Image files | If the user selects a .GIF, .JPG, or .BMP image file in the Navigation pane, an image viewer, identified by the View tab, is available in the Content pane. |
| HTML files | If the user selects an HTML file in the Navigation pane, two tabs are displayed at the bottom of the Content pane, labeled View and Source.<br>View tab<br>    The View tab selects an HTML viewer. This viewer lets the user see the rendered HTML file, as the user would see it in a web browser.<br>Source tab<br>    The Source tab selects an Editor that lets the user see and edit the file as raw HTML source. |
| .java files | If the user selects a .java file in the Navigation pane, the system displays three tabs labeled Source, Doc, and Design.<br>Source tab<br>    If the user selects the Source tab when viewing a .java file, the system will display the JBuilder Java Source Code Editor. This is a full-featured, syntax-highlighted programming editor, with several popular key mappings.<br>Doc tab<br>    If the user selects the Doc tab when viewing a .java file, the system will display<br>    the corresponding reference doc for that .java file, if there is one. Java supports a documentation standard called JavaDoc that automatically generates HTML documentation pages from .java source code and comments.<br>    JBuilder has produced an enhanced version of JavaDoc, called JBDoc. JBDoc produces HTML files that show additional information about JavaBeans properties, methods and events. JBuilder comes with JavaDoc or JBDoc HTML pages installed for the following:<br>    JavaSoft packages (JavaDoc)<br>    Borland JBuilder (borland.jbcl) packages (JBDoc)<br>    Selected third-party packages<br>    If the user clicks on the Doc tab for any of these provided java files, will view the HTML documentation page for the class.<br>Design tab<br>    If the user selects the Design tab when viewing a java file, the system will display the JBuilder visual design tools for that class. For example, if the user selects the WelcomeFrame.java class in the Welcome project (or a Frame class in the user's own project), the system will display the JBuilder UI Designer in the Content pane. This designer will show the user what the UI appearance of this class will be at run-time, and lets the user visually construct and develop the user's UI. |

The user can expand the Content pane to fill the entire AppBrowser window. The user simply toggles it in and out of full window mode with the View|Toggle Curtain menu command or with the keyboard accelerator indicated on that menu (Alt+Z key in the default key mapping). The user can also use the mouse to resize the window or any of its panes by dragging the pane boundaries.

Internally, the viewers used in the Content pane implement a standard interface. The ANT node used in the Navigation pane provides a list of viewers to be used when selected. Viewers can also be provided via addins to the system. Viewers used in the Content pane can respond to navigational requests called Anchors. An anchor represents a location within a view that can be tracked such as a line number in a source file or an HTML anchor in an HTML document. Viewers in the Content pane have access to a status bar that is common to all viewers in this pane. The status bar has multiple status areas that can be written to. They also can provide menu items to the system's menu, a local tool bar for the Content pane, or context menus.

D. Structure pane

The Structure pane of the AppBrowser shows a structural analysis of the file that the user has selected in the Navigation pane. When the user has selected a java file and then selects the Design tab at the bottom of the Content pane, the Structure pane displays the designable objects in the file, and how they are nested and interrelated. For example, if one selects a java file, the Structure pane shows structural information about the java code in that file, such as Imported packages.

The classes and/or interfaces in the file.

Any ancestor classes and/or interfaces.

Variables and methods.

This structural analysis is in the form of a hierarchical tree, resembling a table of contents for the file. This tree view is called the "Component Tree."

Figure 4B:
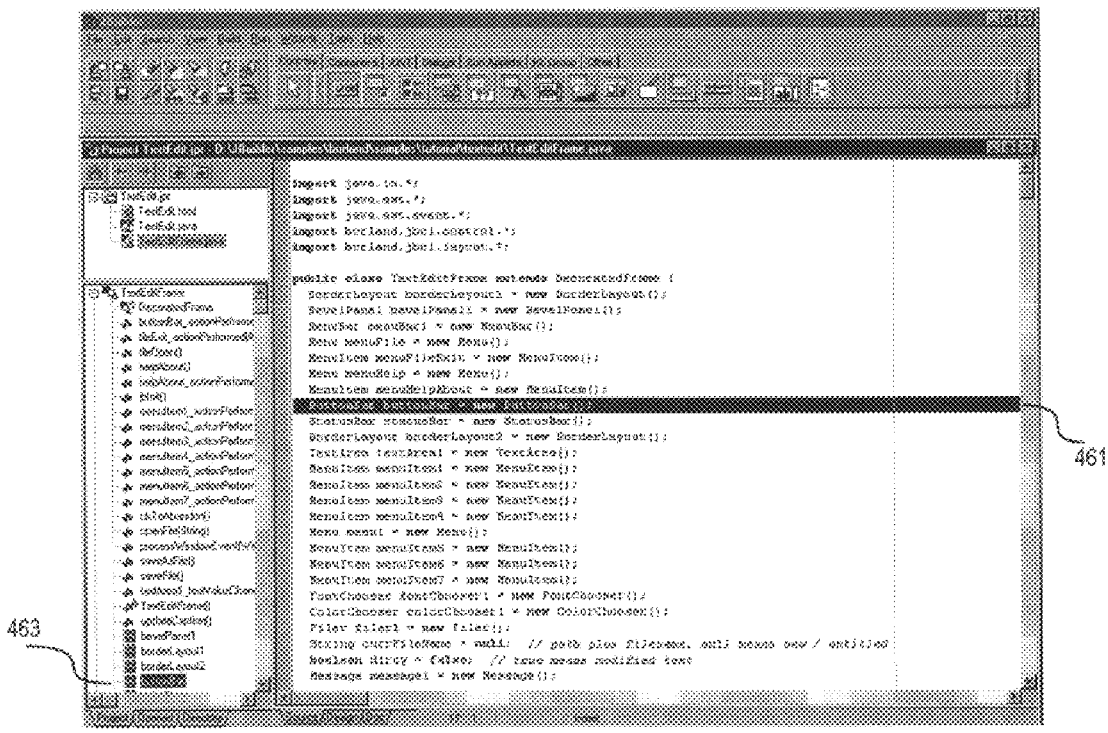
FIG. 4B is a bitmap screen shot illustrating synchronization among the different panes of the browser.

The Structure pane facilitates user navigation of source files. Not only does the Structure pane show the user the structure of the file, the user can also use it as a quick navigation tool to the various structural elements in the file. For example, if the user has selected a java file, the system displays classes, variables, and methods for the file in the Structure pane. The user can then click on any of those elements in the Structure pane and the Content pane will move to and highlight that element in the source code. As illustrated in FIG. 4B, for instance, selection of a button bar tag 463 in the Structure pane automatically causes the Content pane to display the corresponding source code line 461, corresponding to that selected tag. Specifically, the Content pane moves automatically to the place in the Java source file where the object is declared. This gives the user a much faster way to browse and find the elements of a java file than scrolling through it or searching for a word. The user can also use the Structure pane for "drilling down" into other ancestor classes and interfaces.

Internally, the Structure pane shows one or more representations of the structure of the current node. The node may have different "flavors" of its structure depending on the current viewer. At the time a node is selected in the Navigation pane, the Structure pane will ask the current viewer for the type of structure anchors it expects and will display a matching structure tree that is created by the ANT node in the navigation pane. Examples of structure include a list of the HTML anchors and links within an HTML document or the tree of classes and their data members and methods found in a Java source file.

The selection of a structure node (anchor) will cause its anchor to be passed to the current viewer of the Content pane which will then navigate the view of the node to a specific location. In the case of Java source files, selecting a method in the Structure pane causes the system to navigate the source file displayed in the Content pane to the line starting the declaration of the method. Structure nodes can provide menu items to the system's menu, context menus, and can support "drilling down" into a new root parent node for the Navigation pane. For example, "drilling down" into a link from an HTML node causes the Navigation pane to show the new document as its root node and add it to the history list.

E. AppBrowser contexts

The AppBrowser operates in several different contexts or modes. Each context is accessed by selecting one of the tabs in the lower right-hand corner of the AppBrowser. Different contexts will now be described.

1. Project context

Figure 5A:
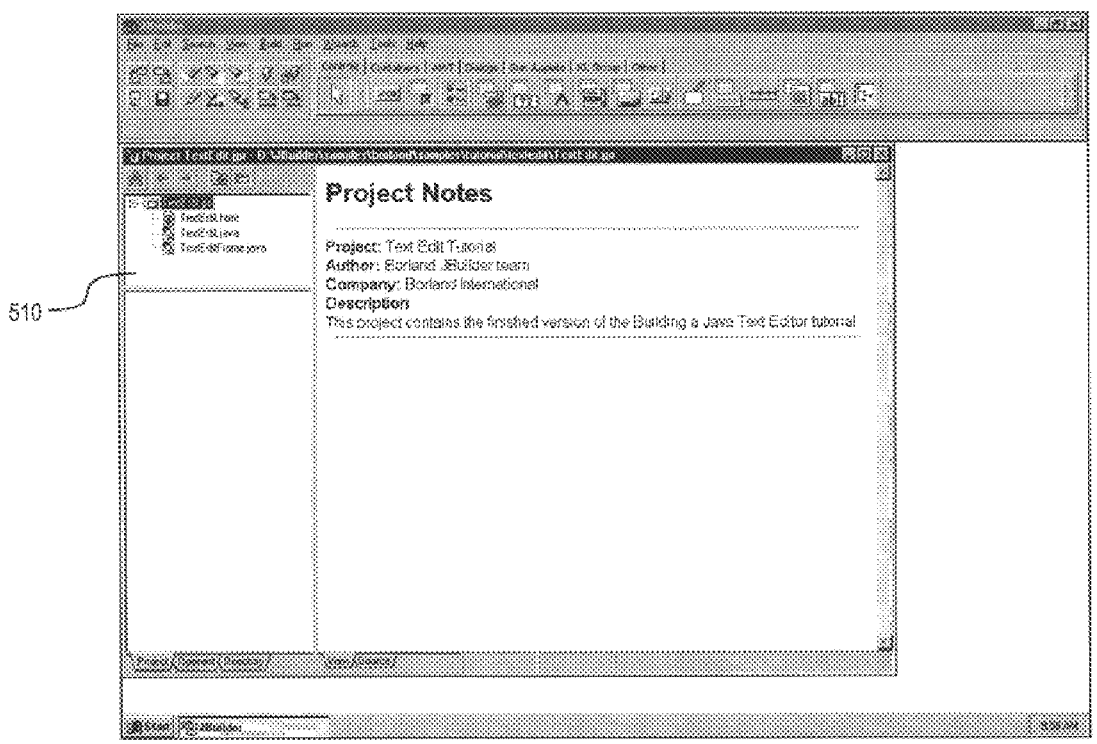
FIG. 5A is a bitmap screen shot illustrating a "project" context of the application browser.

The Project context, shown at 510 in FIG. 5A, is the default context and is the context which the user will employ most often. It comes up automatically if the user does not click any of the AppBrowser's tabs. In Project context, the Navigation pane shows a tree of all the files the user has put into his or her project, with the main project (jpr) file at the root, and the other files (Java source files, image files, HTML files, and so on) in the branches.

2. Opened Files context

Figure 5B:
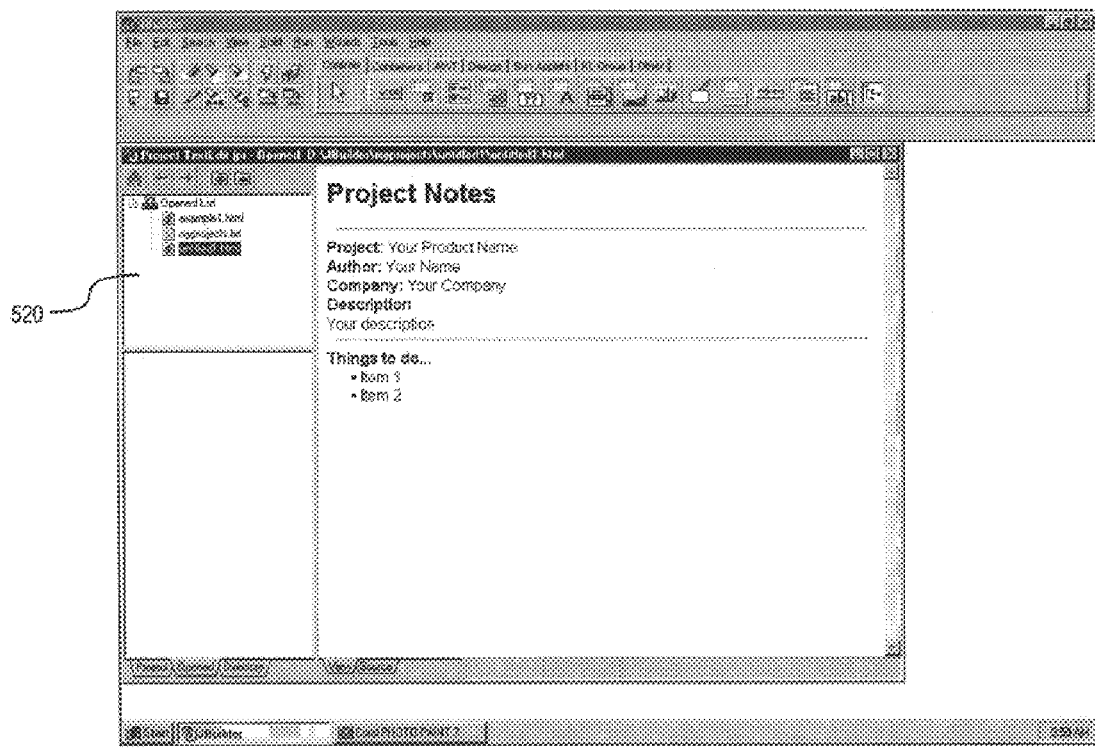
FIG. 5B is a bitmap screen shot illustrating an "opened files" context of the application browser.

To keep certain files close at hand, the user puts them in a list in an Opened Files context, shown at 520 in FIG. 5B. The Opened tabbed page provides a list of currently active or open files. These include files that the user has edited in the current AppBrowser session as well as files that the user explicitly dropped onto the Opened tab from the Directory or Project tabs. Thus to add a file to the Opened Files list, the user simply drags it to the Opened tab at the bottom of the AppBrowser (which is showing even when the AppBrowser is in Project context). The user can even drag a file from another AppBrowser's Project context, when more than one AppBrowser is opened. In this manner, the user can gain quick access to files from the Opened Files context.

3. Directory context

Figure 5C:
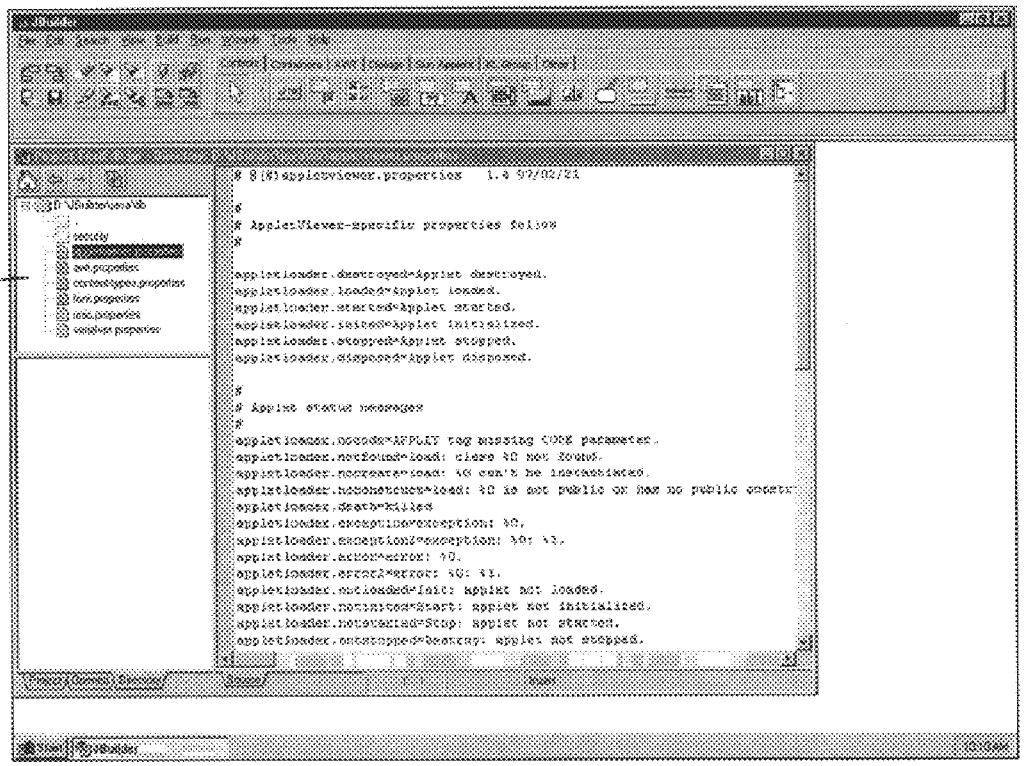
FIG. 5C is a bitmap screen shot illustrating a "directory" context of the application browser.

The Directory context, shown at 530 in FIG. 5C, is where the user obtains a tree view of the file directory of the user's system. The view is optimized for Java projects, by showing only certain kinds of files relevant to Java projects and hiding all the others.

4. Hierarchy context

Figure 6A:
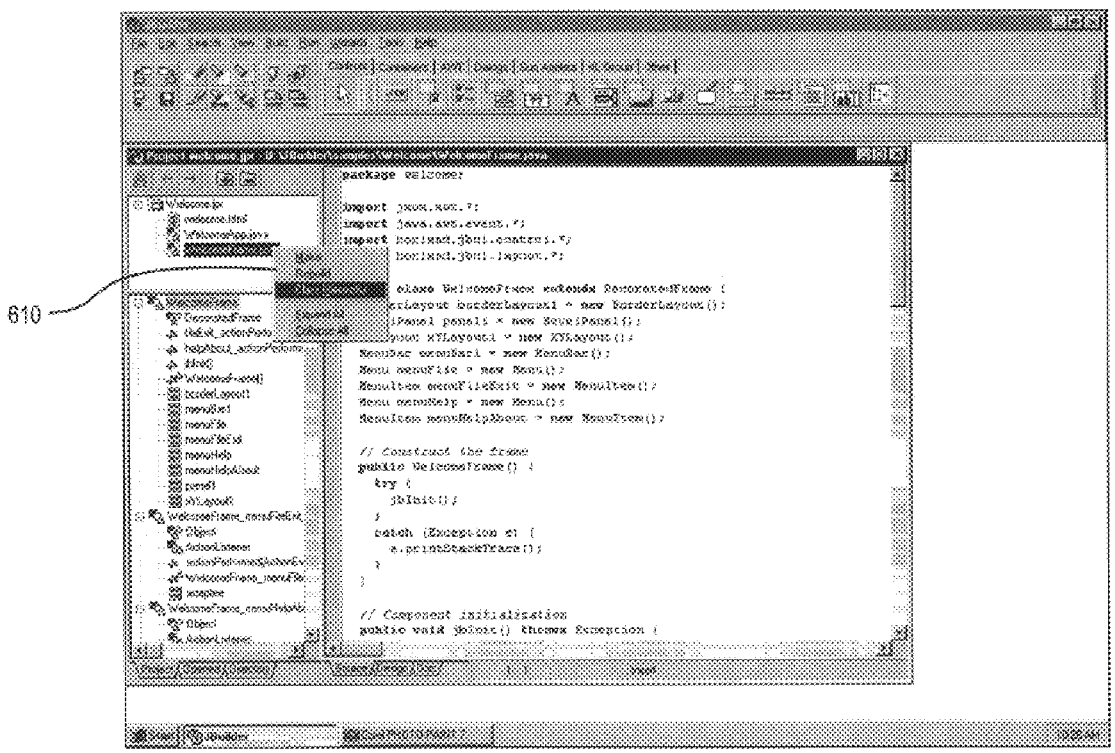
FIG. 6A is a bitmap screen shot illustrating a "hierarchy" context of the application browser.
Figure 6B:
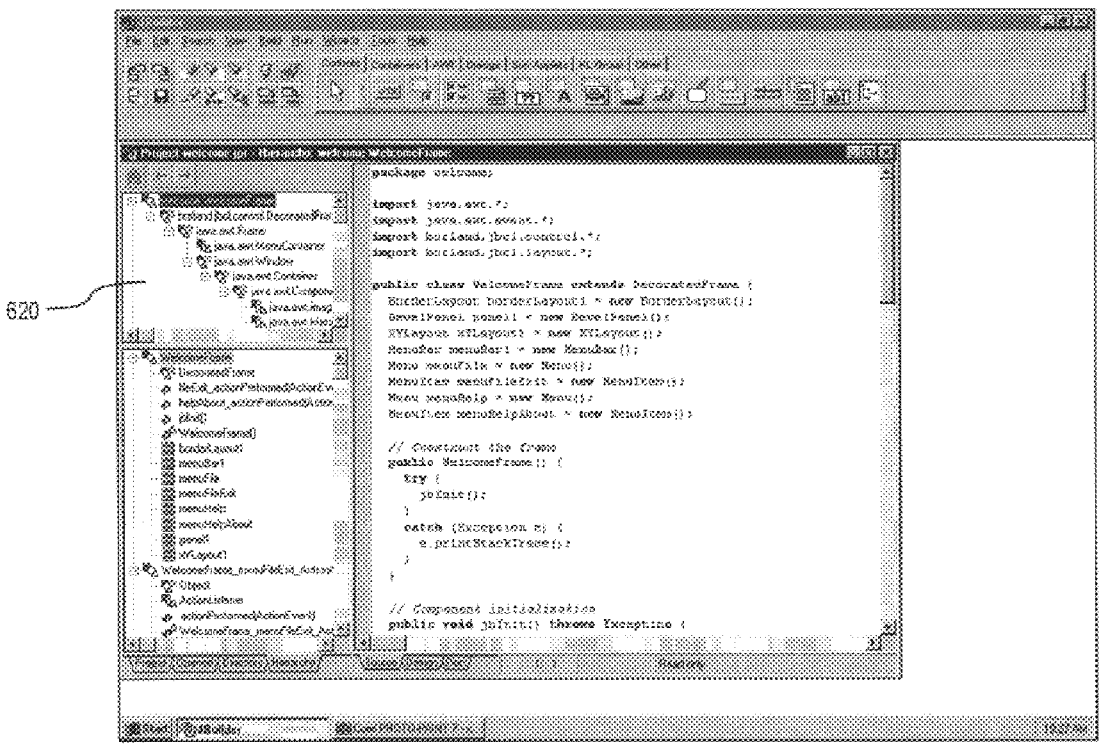
FIGS. 6B–C are bitmap screen shots illustrating operation of the "hierarchy" context of the application browser.
Figure 6C:
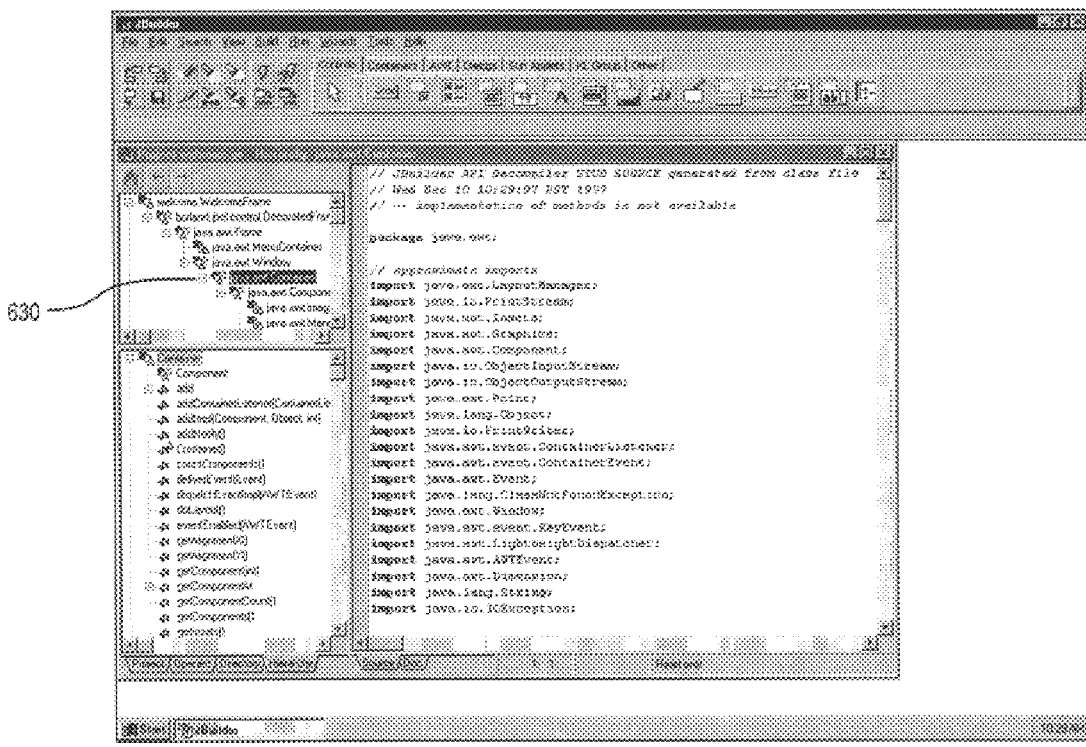

To invoke the Hierarchy context, the user right clicks the name of any Java file or Java package in the Navigation pane (while in the Project context, the Opened Files context, or the Directory context). This action causes the system to display a pop-up menu with a Class Hierarchy option, as shown at 610 in FIG. 6A. Upon the user selecting that option, the AppBrowser displays a new tabbed page with a list showing the Java file or Java package that the user chose, plus all its ancestors among the Java classes. This is illustrated in FIG. 6B at 620. Here, the user can see inheritance relationships among classes. For a given class, for instance, the user can determine which class it extends from, which class is its parent, which class is its grandparent, and which methods it inherits from its ancestors. As shown in FIG. 6C at 630, the user can easily select among different files and packages.

5. Search context

To invoke the Search context, the user selects from the main JBuilder menu Search Source Path. The system displays a dialog box asking the user what terms to search for. After the user has completed input, the system finds all the files with the search word in them and displays their names in the Navigation pane (in a tree). Now, the user can select any file name in this new Navigation pane, to see the Java source code in the Content pane.

F. Drilling down into other classes and interfaces

Often the user will need to look at java files that are not part of the user's project, but which are referred to in the class the user is editing. This might be an ancestor class or the class of some instance variable. There are several traditional ways the user could navigate to the file needed. If the user knows the full package and class name, he or she could open it in a separate browser (File|Open/Create), browse for it using Search|Browse Symbol, or use the Directory Browser to look for it on the disk. The Structure pane provides a much faster way, however.

Figure 7A:
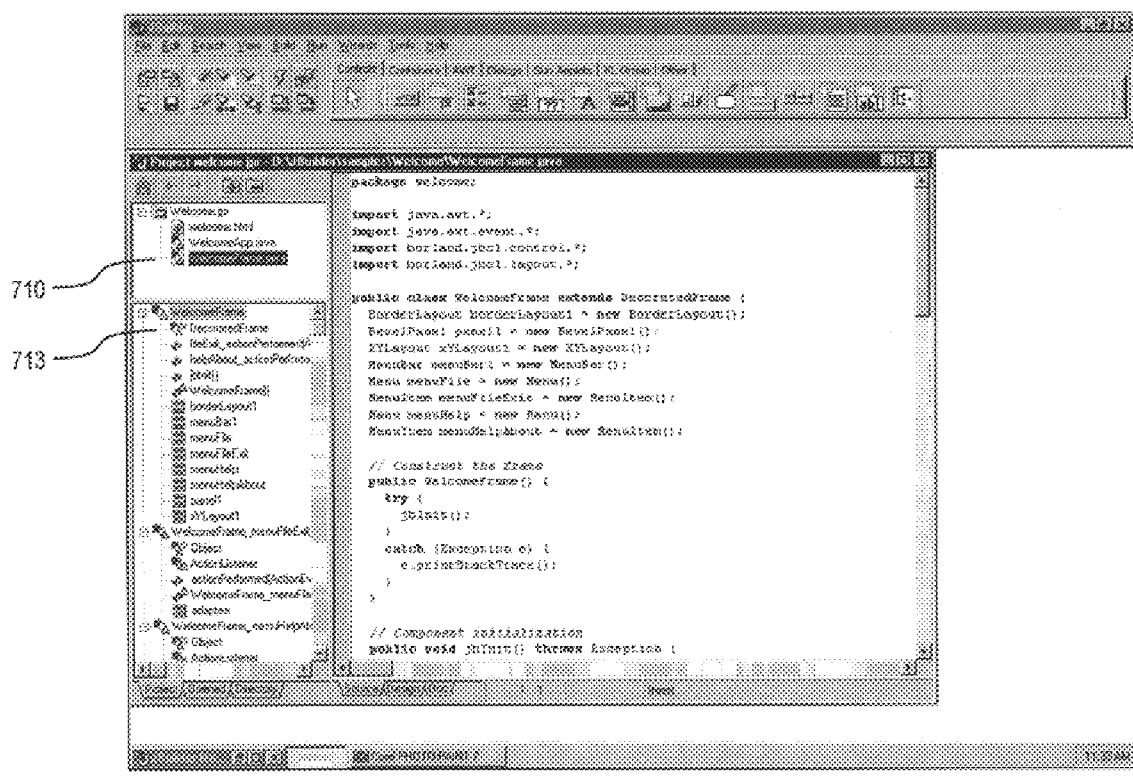
FIGS. 7A–C are bitmap screen shots illustrating operation of "drill down" operation of the application browser.
Figure 7B:
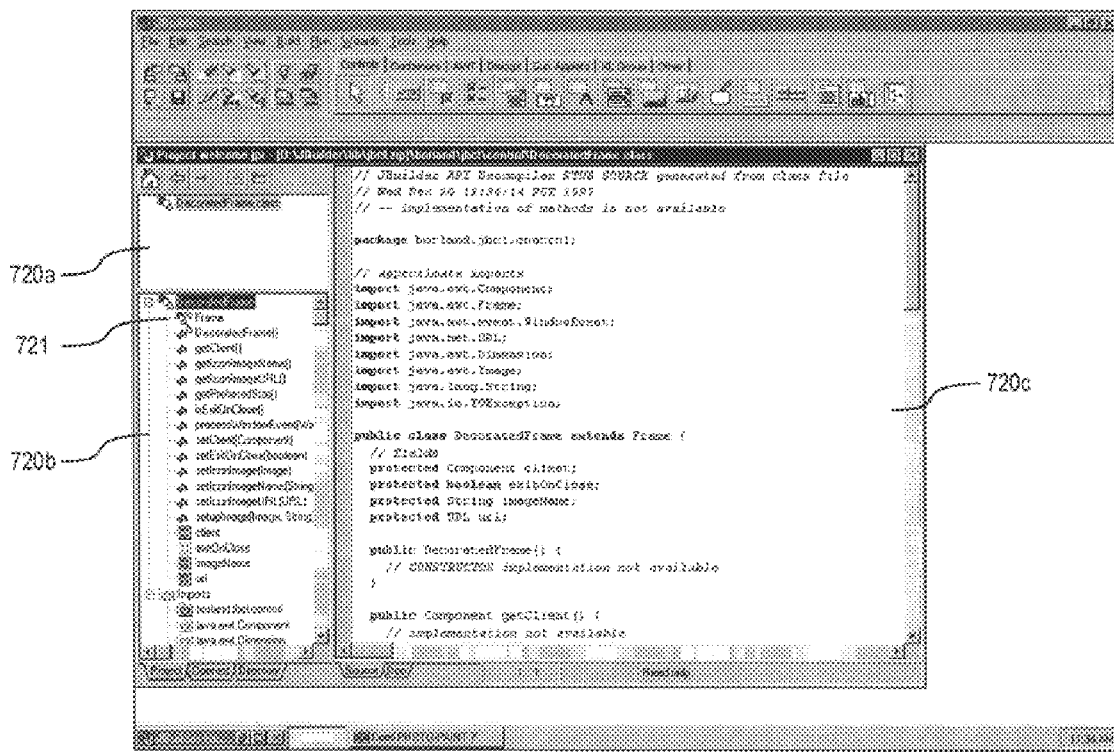
Figure 7C:
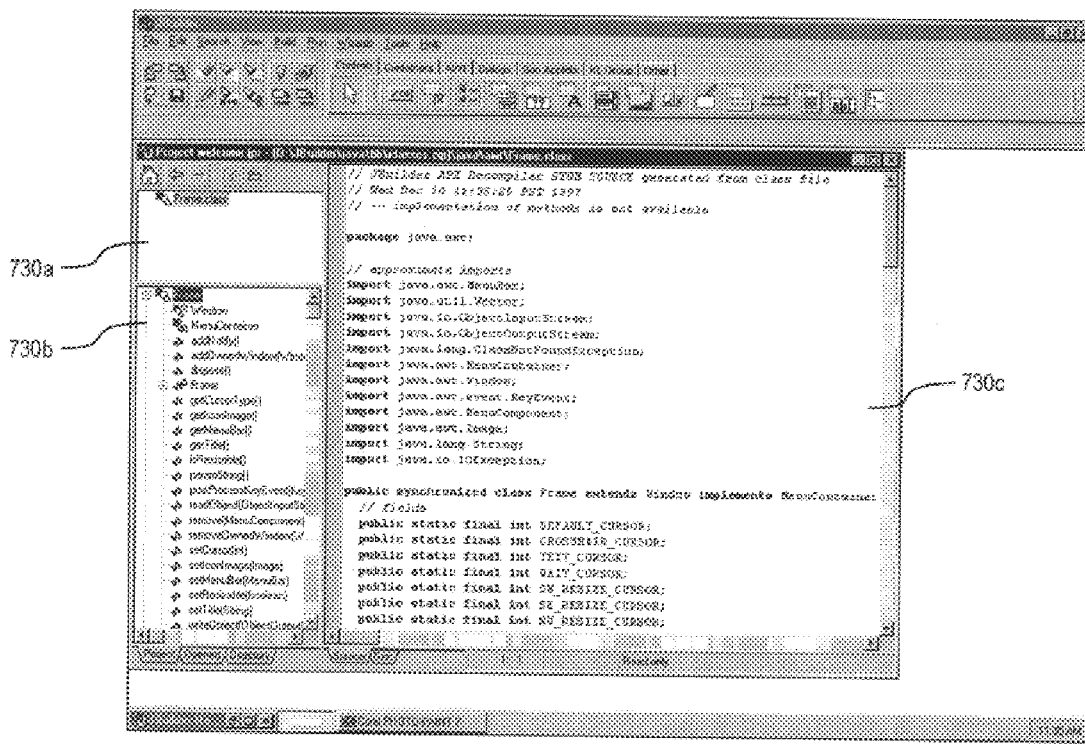

To see the java file for an ancestor class, an interface, or the type of a variable shown in the Structure pane, the user just double-clicks it in the AppBrowser. In turn, the App-Browser will immediately go to that file, showing it in all three panes. This is illustrated in FIGS. 7A–C. In FIG. 7A, the user has opened a project (e.g., Welcome Project) and selected WelcomeFrame.java in the Navigation pane, as shown at 710. In the Structure pane, note that Welcome-Frame extends DecoratedFrame, as shown at 713. Upon the user double-clicking DecoratedFrame in the Structure pane, the AppBrowser shows DecoratedFrame, as illustrated in FIG. 7B. Note particularly that DecoratedFrame is shown in all three panes 720a, 720b, and 720c.

Continuing with the example, upon the user double-clicking Frame at 721, the system "drills down" another level into the Frame parent class of DecoratedFrame, as shown by panes 730a, 730b, and 730c in FIG. 7C. Note that not only is the source of the Frame class shown (at 730c), but the user can also click on the Doc tab and read the reference doc for the class as well.

If the user navigates to a file for which no source code is found, the system will synthesize a temporary source file to show in the Source pane. This temporary file contains method stubs for corresponding public methods. The temporary stub file displays method signatures for public methods and comments indicating that no implementation information is available. The stub source is only generated temporarily in memory, and it is not saved to disk. A Doc tab is also displayed that shows the reference HTML doc for the class.

G. Methodology summarized

Figure 8A:
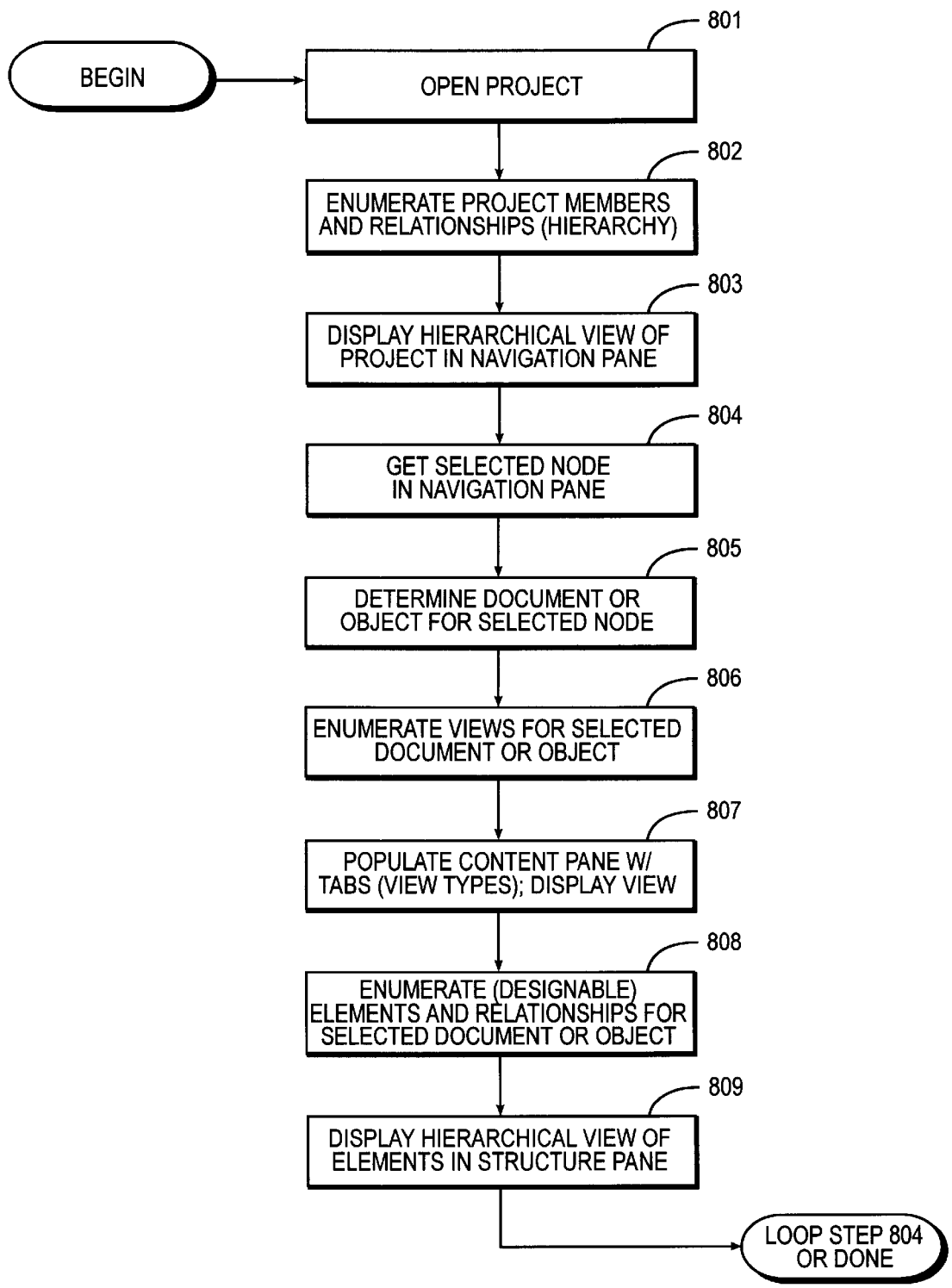
FIG. 8A is a flow chart illustrating general methodology of the present invention.

FIG. 8A is a flow chart summarizing the general methodology of the present invention. At step 801, the user opens a project, which is associated with a particular application project (e.g., Java project) under development. At step 802, the system enumerates the various members (e.g., files) and relationships thereof, for the project. Based on this determination, the system can now display a hierarchical view (e.g., tree) of the project in the navigation pane, as indicated at step 803.

At step 804, the system gets the currently selected node in the navigation pane; node selection is affected by use of the navigation buttons (e.g., forward, back, and home buttons). From this, the system can determine the actual document or object (for the selected node), as indicated at step 805. At step 806, the system enumerates the view(s) for the selected document or object. Based on these determined views, the system populates the content pane with tabs (i.e., labels corresponding to the different view types), and displays a current view (i.e., content). The user switches to a particular view by selecting its tab.

As indicated at step 808, the system proceeds to enumerate the designable elements (i.e., subobjects) and relationships thereof for the selected document or object. Now, at step 809, the system can proceed to display a hierarchical view of these elements in the structure pane. Thereafter, the method can loop back to step 804 to refresh the panes for a newly selected node (i.e., a new node selected by the user), or terminate in the event that the user has finished.

Figure 8B:
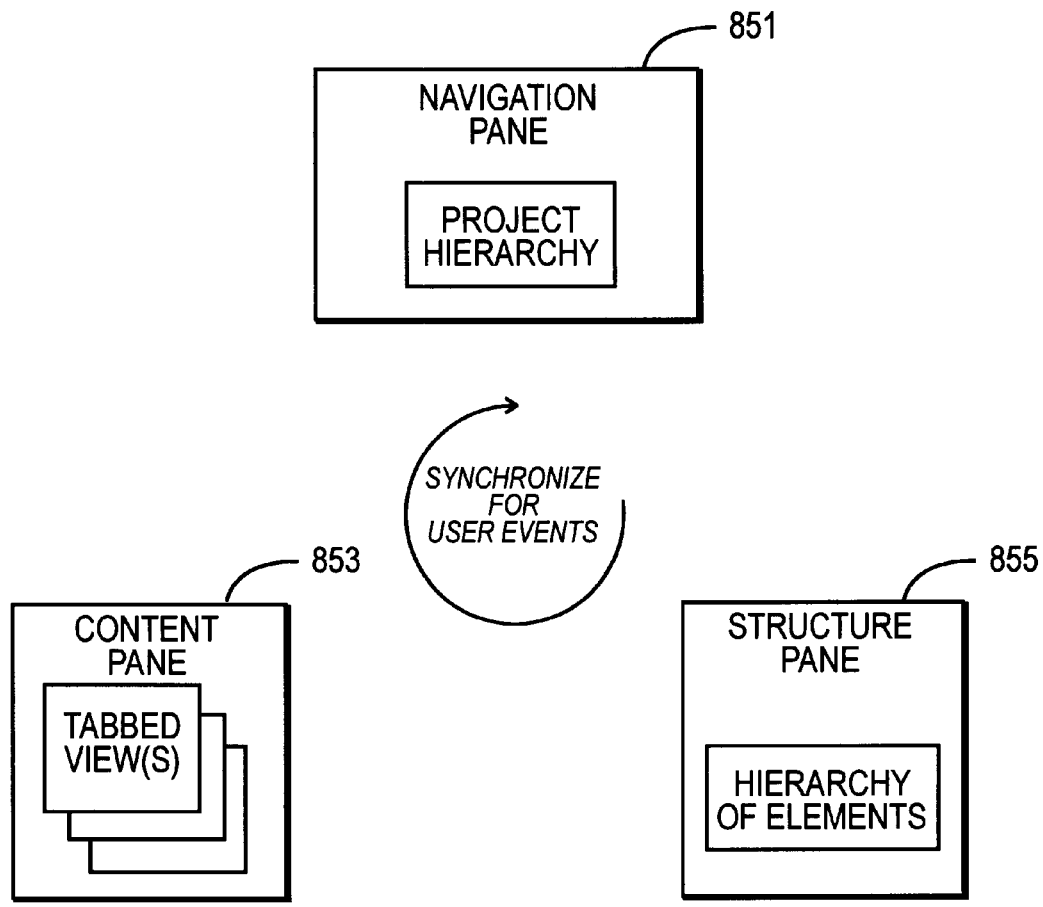
FIG. 8B is a block diagram illustrating synchronization of the user interface panes.

FIG. 8B is a block diagram illustrating synchronization among the different panes. As shown, navigation pane 851 displays the project hierarchy. Upon the occurrence of a user event in the navigation pane (e.g., the user selects a new node), the content pane 853 and the structure pane 855 update the display of their respective information, based on the newly selected node. In a similar manner, the content pane 853 and the structure pane 855 maintain synchronization for user events in those panes. For instance, if the user selects a particular node in the structure pane 855 (e.g., the user selects a particular method or property of an object), the content pane 853 updates display of the particular information associated with that selected structure node, such as displaying a particular source code line relevant to that selected node. In a corresponding manner, selection of a particular line of code in the content pane 853 triggers synchronization of the structure pane 855, so that the structure pane displays the appropriate node for the element or object in the currently selected line of source code.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a development system for creating computer programs, a method for assisting a user with development of a program, said program being developed from a project comprising at least a plurality of files employed for developing the program, the method comprising:

displaying a graphical user interface window having a navigation pane, said navigation pane for displaying a hierarchical view of said project comprising a tree having a plurality of nodes of files employed for developing said program of said project, said nodes being displayed in collapsible outline format, so that the user can navigate to a particular file of the project by selecting one of the nodes;

simultaneously displaying in said graphical user interface window a content pane, said content pane for displaying contents of the particular file selected at the navigation pane; and simultaneously displaying in said graphical user interface window a structure pane, said structure pane for displaying a hierarchical view of said particular file comprising a tree having a plurality of nodes, so that the user can navigate to a particular object of the particular file by selecting one of the nodes;

wherein all said panes remain automatically synchronized by the system during system operation.

2. The method of claim 1, further comprising:

maintaining a history list for tracking which nodes the user has selected in the navigation pane.

3. The method of claim 1, further comprising:

providing navigation buttons allowing the user to navigate forward and backward through the history list, for re-selecting nodes of the navigation pane.

4. The method of claim 1, wherein said content pane provides at least one viewer for viewing contents of a particular selected file within said content pane.

5. The method of claim 4, wherein the particular selected file is a source code file and wherein said at least one viewer comprises a source code viewer.

6. The method of claim 4, wherein the particular selected file is a hypertext markup language (HTML) file and wherein said at least one viewer comprises an HTML viewer and an HTML code editor.

7. The method of claim 4, wherein each at least one viewer is associated with a particular tab which can be selected by the user for displaying the viewer as the current viewer in the content pane.

8. The method of claim 1, wherein said plurality of files includes source code files.

9. The method of claim 8, wherein interdependencies exist between various files of the project.

10. The method of claim 9, wherein a file which is dependent on another file is represented as a child of that other file in the navigation pane.

11. The method of claim 1, further comprising:
upon user selection of a particular node in the navigation pane, synchronizing the content pane and the structure pane for the selected node.

12. The method of claim 1, wherein said structure pane displays designable objects for said particular file, said structure pane indicating how the objects are interrelated to one another.

13. The method of claim 12, wherein said particular file comprises a Java file and wherein the structure pane displays structural information about Java code in the particular file.

14. The method of claim 13, wherein said structural information about Java code comprises information about Java classes and class relationships.

15. In a development system, a method for assisting a user with development of a program, said program being developed from a project comprising at least a plurality of files, the method comprising:
displaying a graphical user interface window having a navigation pane, said navigation pane for displaying a hierarchical view of said project comprising a tree having a plurality of nodes, so that the user can navigate to a particular file of the project by selecting one of the nodes;
displaying in said graphical user interface window a content pane, said content pane for displaying contents of the particular file selected at the navigation pane;
displaying in said graphical user interface window a structure pane, said structure pane for displaying a hierarchical view of said particular file comprising a tree having a plurality of nodes, so that the user can navigate to a particular object of the particular file by selecting one of the nodes;
upon user selection of a particular node in the navigation pane, synchronizing the content pane and the structure pane for the selected node;
wherein said structure pane displays designable objects for said particular file, said structure pane indicating how the objects are interrelated to one another;
wherein said particular file comprises a Java file and wherein the structure pane displays structural information about Java code in the particular file;
wherein said structural information about Java code comprises information about Java classes and class relationships; and further comprising:
receiving a request for drilling down into an ancestor class; and
in response to said request, displaying information for the ancestor class.

16. The method of claim 15 wherein said displaying information for the ancestor class comprises displaying Java code for the ancestor class in the content pane.

17. The method of claim 16, wherein said displaying information for the ancestor class further comprises displaying structural information about the Java code for the ancestor class in the structure pane.

18. The method of claim 15, wherein said request comprises user selection of a node in the structure pane which is an ancestor of a node currently selected in the structure pane.

19. In a development system, a method for assisting a user with development of a program, said program being developed from a project comprising at least a plurality of files, the method comprising:
displaying a graphical user interface window having a navigation pane, said navigation pane for displaying a hierarchical view of said project comprising a tree having a plurality of nodes, so that the user can navigate to a particular file of the project by selecting one of the nodes;
displaying in said graphical user interface window a content pane, said content pane for displaying contents of the particular file selected at the navigation pane; and
displaying in said graphical user interface window a structure pane, said structure pane for displaying a hierarchical view of said particular file comprising a tree having a plurality of nodes, so that the user can navigate to a particular object of the particular file by selecting one of the nodes, wherein said particular object comprises a user interface object;
wherein the graphical user interface maintains synchronization among all panes of the graphical user interface.

20. A development system for developing software programs comprising:
a compiler for compiling files into a program; and
an integrated development environment providing a user interface comprising:
a first display region for representing said files as a hierarchical tree comprising a plurality of nodes, wherein each node corresponds to a particular file, and wherein said nodes are arranged in the tree to represent interdependencies among said files;
a second display region for viewing contents of a particular file whose node is selected in the first display region; and
a third display region for representing the particular file as a hierarchical tree comprising a plurality of nodes, wherein each node corresponds to a distinguishable element of the file, and wherein said nodes are arranged in the tree to represent interdependencies among said elements;
wherein said first, second, and third display regions are simultaneously displayed in the user interface of said integrated development environment, and wherein the user interface maintains synchronization among all display regions of the user interface.

21. The system of claim 20, further comprising navigation buttons allowing a user to navigate among nodes in the first display region.

22. The system of claim 20, wherein said second display region includes at least one viewer for viewing contents of a particular file whose node is selected in the first display region.

23. The system of claim 22, wherein said particular file comprises a source code file and wherein said at least one viewer comprises a source code editor allowing a user to modify source code contained therein.

24. The system of claim 22, wherein the particular selected file is a hypertext markup language (HTML) file and wherein said at least one viewer comprises an HTML viewer and an HTML code editor.

25. The system of claim 20, wherein a file which is dependent on another file is represented as a child of that other file in the tree of the first display region.

26. The system of claim 20, wherein said synchronization includes synchronizing the second and third panes upon user selection of a particular node in the first pane.

27. The system of claim 20, wherein said synchronization includes synchronizing the second pane to be positioned at a particular line of source code upon user selection of a particular node in the third pane representing an object which is declared in the source code at said particular line.

28. The system of claim 20, wherein the distinguishable elements in the file include user interface elements.

29. In a development system, a method for assisting a user with management of a development project comprising at least a plurality of files, at least some of the files including a plurality of objects, the method comprising:

displaying an integrated user interface having a first region for displaying a hierarchical view of said project, the hierarchical view comprising a tree having a plurality of nodes, so that the user can navigate to a particular file of the project by selecting one of the nodes;

displaying in said integrated user interface a second region for viewing contents of the particular file selected at the first region; and displaying in said integrated user interface a third region for displaying a hierarchical view of said particular file, the hierarchical view comprising a tree having a plurality of nodes, so that the user can navigate to a particular object of the particular file by selecting one of the nodes;

wherein said first, second, and third display regions are simultaneously displayed in the integrated user interface of said development system, and wherein the integrated user interface maintains synchronization among all display regions of the integrated user interface.

30. The method of claim 29, wherein said particular file comprises a Java file and wherein the third region displays structural information about Java code in the particular file.

31. The method of claim 30, wherein said structural information about Java code comprises information about Java classes and class relationships.

32. The method of claim 29, wherein said second region displays source code for an ancestor class in response to selection of a node which is an ancestor of a node previously selected in the third region.

33. The method of claim 29, wherein said third region displays children nodes for representing methods for a particular object whose node has been selected.

* * * * *